PIEZOELECTRIC OXIDE MATERIALS

Filed June 10, 1971 2 Sheets-Sheet 1

3,691,079
PIEZOELECTRIC OXIDE MATERIALS

Noboru Ichinose, Yokohama, Japan, assignor to Tokyo Shibaura Electric Co., Ltd., Kawasaki-shi, Japan Filed June 10, 1971, Ser. No. 151,643
Claims priority, application Japan, June 13, 1970, 45/50,716
Int. Cl. C04b *35/46*
U.S. Cl. 252—62.9 1 Claim

ABSTRACT OF THE DISCLOSURE

A piezoelectric oxide material essentially consisting of a solid solution having a composition of the general formula:

$$(1-x)PbTiO_3—xPb(Me_{1/3}Nb_{2/3})O_3$$

where $x$ ranges 0.02 to 0.20 and Me denotes at least one metal selected from the group consisting of Cd and Cu.

This invention relates to piezoelectric oxide materials and more particularly to the piezoelectric oxide materials formed of oxides having a system of $$PbTiO_3—Pb(Me_{1/3}Nb_{2/3})O_3$$

(where Me denotes at least one metal selected from the group consisting of Cd and Cu) prepared by solid phase reaction which is stable at temperatures greater than 300° C. and are also well adapted for high frequency applications of the order of mHz.

As is well known, piezoelectric materials are used in wide fields including supersonic vibration elements, transducer elements of, for example, mechanical filters, elements of ceramic filters and resonators, and elements of vibratometers and accelerometers. For such applications, there have been developed improved forms of piezoelectric binary oxide material having a system of $PbTiO_3—PbZrO_3$. There have been attempts to elevate piezoelectric properties by adding additives such as $Bi_2O_3$, $Cr_2O_3$, $MnO_2$ and ZnO to the aforesaid binary system of $PbTiO_3—PbZrO_3$. There have also been proposed piezoelectric ternary oxide materials of $$PbTiO_3—PbZrO_3—Pb(Mg_{1/3}Nb_{2/3})O_3$$

However, these prior art piezoelectric materials had a low Curie point of about 300° C. and a high dielectric constant of about 1000, and accordingly could not be used at temperatures higher than said level as well as in high frequency regions.

It is accordingly an object of this invention to provide composite piezoelectric metal oxide materials having a sufficiently low dielectric constant to be used as elements of high frequency filters and resonators.

Another object of the invention is to provide composite piezoelectric metal oxide materials capable of operating at temperatures higher than 300° C. under stable condition.

Figure 1:
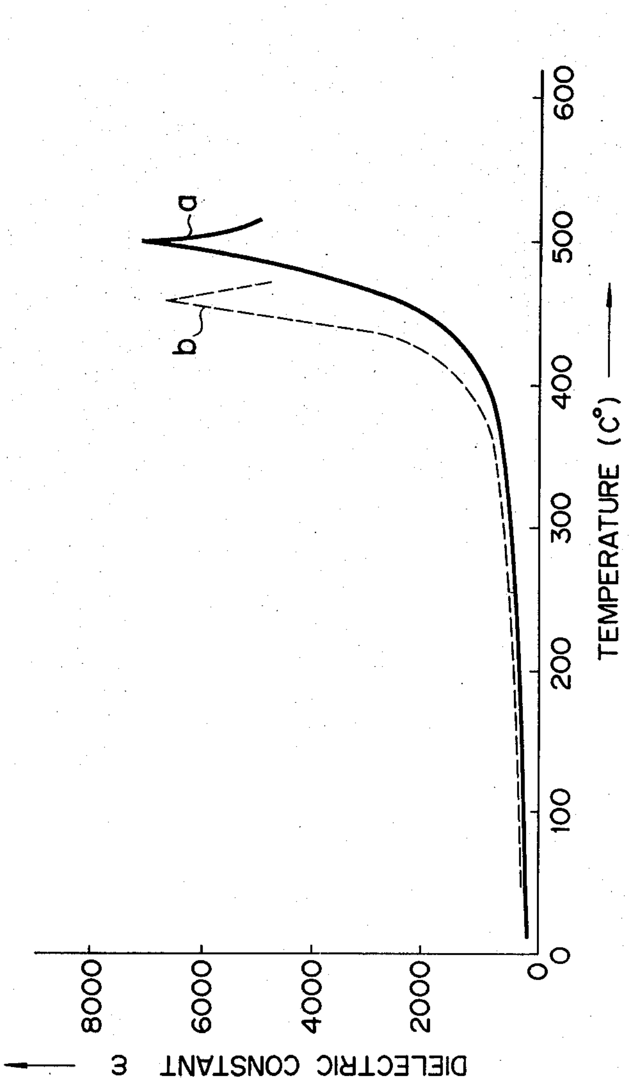
Figure 2:
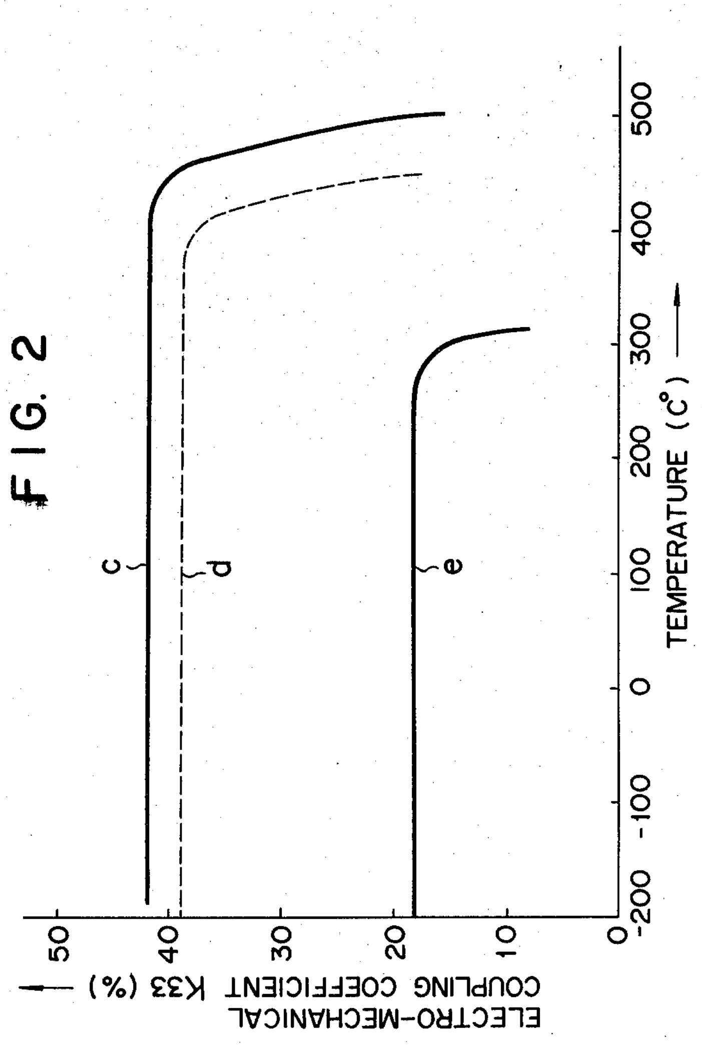

The present invention can be more fully understood from the following detailed description when taken in conjunction with reference to the appended drawings, in which:

FIG. 1 is a curve diagram showing changes with temperature in the dielectric constant of two samples of the basic piezoelectric metal oxide materials according to this invention; and FIG. 2 is a curve diagram showing changes with temperature in the electro-mechanical coupling coefficient (hereinafter referred to as "$K_{33}$") of the two samples of FIG. 1 and a reference sample.

This invention provides piezoelectric binary oxide materials of perovskite structure prepared by solid phase reaction and formed of a system of $$(1-x)PbTiO_3—xPb(Me_{1/3}Nb_{2/3})O_3$$

(where $x$ denotes values of 0.02 to 0.20 and Me represents at least one metal selected from the group consisting of Cd and Cu; hereinafter briefly indicated as Me:Cd, Cu).

The above-mentioned piezoelectric oxide materials of this invention can generally be easily manufactured by the known powder metallurgical process. For example, there are accurately weighed out the prescribed proportions of raw oxides such as PbO, $TiO_2$, $Pb_2O_5$ and MeO (Me:Cd, Cu). They are well mixed, in for example, a ball mill. The raw materials used may be compounds thermally convertible to oxides, such as hydroxides, carbonates and oxalates of metals. The mixture is presintered at temperatures of about 600° to 900° C. and further pulverized to prescribed fine particles again in a ball mill. After addition of a binder such as polyvinyl alcohol, the mass is molded into a shaped article at a pressure of 0.5 to 2 tons/cm.$^2$ and finally sintered at temperatures of 1000° to 1250° C. Since part of PbO, a component of the piezoelectric material, is likely to be evaporated off during said sintering, the operation is conducted in a closed furnace. The period during which the mass should be kept at a maximum temperature generally ranges from 0.5 to 3 hours. The resulting sintered body of oxides can be polarized by the known process, for example, by forming a pair of electrodes on both sides of the sintered body and impressing across said electrodes a voltage having a D.C. field intensity of 40 to 60 kv./cm. for 1 to 2 hours in silicone oil at temperatures of 150° to 200° C.

Following is the reason why, in the basic piezoelectric metal oxide materials of this invention expressed as $(1-x)PbTiO_3—xPb(Me_{1/3}Nb_{2/3})O_3$ (where Me:Cd, Cu), $x$ is chosen to have values of 0.02 to 0.20, that is, the proportion of $Pb(Me_{1/3}Nb_{2/3})O_3$ is limited to 2 to 20 mol percent. If $x$ falls to below 0.02, the resulting raw materials will be more difficult to sinter, failing to display desired piezoelectric properties. Conversely if $x$ rises beyond 0.20, the resulting piezoelectric material will decrease in the Curie point (fall to below 400° C.), are not useful at temperatures higher than 300° C. under stable condition, with the resultant decline in the electromechanical coupling coefficient $K_{33}$.

$PbTiO_3$ has a Curie point approaching 500° C. and has been deemed as a hopeful piezoelectric material. Since, however, it is difficult to sinter, it has failed to be put to practical use. In contrast, the piezoelectric oxide materials of this invention particularly contain a component of $Pb(Me_{1/3}Nb_{2/3})O_3$ (Me:Cd, Cu), which acts as a mineralizer to facilitate sintering. This ease of sintering eventually decreases sintering temperature, inhibits the evaporation of PbO, a component of the piezoelectric material and enables a compact piezoelectric material to be easily manufactured.

This invention will be more fully understood by reference to the examples which follow.

EXAMPLE 1

There were accurately weighed out the prescribed proportions of PbO, $TiO_2$, $Nb_2O_5$ and MeO (Me:Cd, Cu) constituting the basic piezoelectric binary metal oxide materials of this invention so as to cause $x$ to account for 0.01 to 0.25. These oxides were well mixed in a ball mill, followed by presintering at 850° C. The mixture was further pulverized to a particle size of 1 to 2 microns again in a ball mill. In this case, there were also prepared reference samples from the prior art piezoelectric materials, followed by similar pulverization. Thus there were provided twenty-one powdered samples in all. After addition of a binder, for example, polyvinyl alcohol, the samples were molded at a pressure of 1 ton/cm.$^2$ and sintered one and a half hours at temperatures of 1000° to 1250° C., obtaining columnar articles 1 mm. in diameter and 3 mm. high. Determination was made of the density of said articles and the dielectric constant thereof by attaching an electrode to both round end faces by baking silver thereto. After polarized by impressing for one and a half hours across the electrodes a voltage having a D.C. field intensity of 50 kv./cm., the articles were determined for piezoelectric properties by a standard process set forth, for example, in the Proceedings of I.R.E., vol. 137, pp. 1378–1395, 1949. Table 1 below presents the results of these determinations, together with the compositions of the sintered samples.

TABLE 1

| Sample | $(1-x)PbTiO_3-xPb(Me_{1/3}Nb_{2/3})O_3$ | F.T. (° C.) | D | ε | $K_{33}$ (percent) | $Q_m$ | Tc (° C.) |
|---|---|---|---|---|---|---|---|
| Reference: | | | | | | | |
| 1 | Me:Cd x=0.01) | 1,250 | 7.18 | | | | |
| 2 | Me:Cu (x=0.01) | 1,250 | 7.20 | | | | |
| Example: | | | | | | | |
| 1 | Me:Cd (x=0.02) | 1,230 | 7.45 | 185 | 0.35 | 251 | 505 |
| 2 | Me:Cu (x=0.02) | 1,230 | 7.50 | 176 | 0.37 | 198 | 518 |
| 3 | Me:Cd (x=0.05) | 1,210 | 7.63 | 231 | 0.38 | 296 | 498 |
| 4 | Me:Cu (x=0.05) | 1,210 | 7.60 | 213 | 0.42 | 252 | 501 |
| 5 | Me:Cd (x=0.07) | 1,190 | 7.68 | 250 | 0.42 | 273 | 476 |
| 6 | Me:Cu (x=0.07) | 1,190 | 7.65 | 238 | 0.45 | 295 | 488 |
| 7 | Me:Cd (x=0.10) | 1,170 | 7.85 | 205 | 0.37 | 306 | 461 |
| 8 | Me:Cu (x=0.10) | 1,170 | 7.79 | 199 | 0.43 | 342 | 470 |
| 9 | Me: Cd (x=0.05) Cu (x=0.05) | 1,170 | 7.82 | 201 | 0.42 | 318 | 469 |
| 10 | Me:Cd (x=0.14) | 1,150 | 7.75 | 173 | 0.40 | 402 | 462 |
| 11 | Me:Cu (x=0.14) | 1,150 | 7.80 | 180 | 0.39 | 381 | 460 |
| 12 | Me:Cd (x=0.18) | 1,110 | 7.70 | 156 | 0.37 | 377 | 436 |
| 13 | Me:Cu (x=0.18) | 1,110 | 7.71 | 161 | 0.37 | 363 | 440 |
| 14 | Me: Cd (x=0.09) Cu (x=0.09) | 1,110 | 7.72 | 165 | 0.38 | 370 | 441 |
| 15 | Me:Cd (x=0.20) | 1,070 | 7.63 | 147 | 0.35 | 320 | 410 |
| 16 | Me:Cu (x=0.20) | 1,070 | 7.60 | 152 | 0.34 | 333 | 405 |
| 17 | Me: Cd (x=0.08) Cu (x=0.12) | 1,070 | 7.64 | 158 | 0.36 | 342 | 413 |
| Reference: | | | | | | | |
| 3 | Me:Cd (x=0.25) | 1,040 | 7.55 | 186 | 0.21 | 185 | 321 |
| 4 | Me:Cu (x=0.25) | 1,040 | 7.53 | 193 | 0.18 | 166 | 336 |

In Table 1 above, F.T. represents sintering temperature (° C.), D density (23° C.), ε dielectric constant (1 kHz., 23° C.), $K_{33}$ electro-mechanical coupling coefficient (percent), $Q_m$ mechanical quality factor and Tc Curie point.

When determination was made of changes with temperature in the dielectric constant of Examples 4 and 11, the curves in FIG. 1 were obtained. In this figure, the curve *a* denotes Example 4 and the curve *b* Example 11. Further when determination was made of changes with time in the electromechanical coupling coefficient $K_{33}$ of said Examples 4 and 11, there were obtained the curves of FIG. 2. In either case, these samples varied little in the electromechanical coupling coefficient $K_{33}$ over a temperature range of from —200° to 400° C. due to their high Curie point, proving that they can be used at a maximum operating temperature allowable for piezoelectric materials. In FIG. 2, the curve *c* represents Example 4, the curve *d* represents Example 11, and the curve *e* Reference 4.

There were prepared ceramic resonators from piezoelectric materials having the same compositions as those of Examples 3, 9 and 15. When determination was made of variations with time and temperature in the resonance frequency of said resonators, the data reported in Table 2 below was obtained, showing that they can well serve practical applications due to good resonance frequency characteristics relative to time and temperature.

TABLE 2

| Example | 3 | 9 | 15 |
|---|---|---|---|
| Resonance frequency characteristics relative to temperature (−40° to 80° C.), p.p.m./° C. | 75 | 80 | 62 |
| Resonance frequency characteristics relative to time (after one year), percent | +0.20 | +0.25 | +0.21 |

As apparent from the foregoing description of the examples, the piezoelectric oxide materials of this invention have many features making them useful at temperatures higher than 300° C. under stable condition as well as in high frequency regions and display excellent performance as various transducer elements due to minimal variation with time and temperature in piezoelectric properties.

Accordingly, the piezeoelectric oxide materials of the invention may be considered adapted for the following applications:

(1) Determination of the vibrations, accelerations and pressures to which there are subjected high temperature objects.

Since the piezoelectric oxide materials of the invention display stable properties even at elevated temperatures, they permit the determination of the vibrations and accelerations of objects used at temperatures approaching 500° C. or those subjected to sharp variations in temperature as well as of the pressures prevailing in high temperature objects.

(2) Application of supersonic waves to high temperature objects.

The present piezoelectric oxide materials can be used as a generator of supersonic waves in working high temperature objects therewith, and also as elements for the supersonic wave examination of such objects.

(3) Generation of powerful supersonic waves.

When subjected to heavy vibrations, the conventional piezoelectric materials fail to be useful because of high heat build-up. However, the present piezoelectric materials withstand use at as high temperatures higher than 300° C., offering prominent advantages in producing strong supersonic waves by vigorous vibrations.

(4) Application in high frequency regions.

The prior art piezoelectric materials had the drawback that they had too high a dielectric constant to be used in high frequency regions. In general, impedance Z is expressed by the equation $Z=d/2\pi f\cdot\epsilon\cdot s$) (where $d$ represents the thickness of a sample, $s$ its cross sectional area, $f$ the frequency of the region in which the sample is used and $\epsilon$ its dielectric constant). $d$ Should be reduced in inverse proportion to $f$. Eventually, therefore, the impedance may be indicated as $Z\propto 1/f^2\cdot\epsilon\cdot s$). If $f$ increases, impedance will sharply decrease because $f^2$ is a large factor. While the matching of Z requires $s$ or $\epsilon$ to be miinmized, $s$ is subject to certain limitation from the standpoint of working, so that it is advantageous to decrease $\epsilon$ for practical purpoe. The piezoelectric materials of this invention have a dielectric constant of about 150, or about one-fifth to one-tenth of that of the conventional product. In the case, therefore, where the prior art product is available up to a frequency of 10 mHz., the present product can be used well up to 50 mHz.

As apparent from the foregoing description, the piezoelectric materials effectively serve the applications which have been impossible with the conventional product. When piezoelectric materials are used as the elements of a high frequency filter or resonator, the frequency characteristics relative to time and temperature present a practical problem. However, the product of this invention can satisfactorily serve practical application because it shows very little variations in said characteristics.

What is claimed is:

1. A piezoelectric oxide composition consisting essentially of a solid solution having a composition expressed by the following general formula:

$$(1-x)PbTiO_3—xPb(Me_{1/3}Nb_{2/3})O_3$$

wherein $x$ is from 0.02 to 0.20 and Me is at least one metal selected from the group consisting of Cd and Cu.

References Cited

UNITED STATES PATENTS

| | | | |
|---|---|---|---|
| 3,268,453 | 8/1966 | Ouchi et al. | 252—62.9 |
| 3,403,103 | 9/1968 | Ouchi et al. | 252—62.9 |
| 3,531,412 | 9/1970 | Nishida et al. | 252—62.9 |
| 3,595,795 | 7/1971 | Tsubouchi et al. | 252—62.9 |

FOREIGN PATENTS

| | | | |
|---|---|---|---|
| 2,008,775 | 9/1970 | Germany | 252—62.9 |

TOBIAS E. LEVOW, Primary Examiner

J. COOPER, Assistant Examiner

U.S. Cl. X.R.

106—39 R